Patented May 10, 1932

1,858,165

UNITED STATES PATENT OFFICE

THOMAS O. McADOO, OF EDGEWOOD, VIRGINIA, ASSIGNOR TO INTERNATIONAL SILICA CORPORATION, A CORPORATION OF VIRGINIA

PROCESS OF OBTAINING ALUMINUM HYDRATE

No Drawing.    Application filed July 19, 1928.   Serial No. 294,063.

This invention relates to a process of obtaining aluminum hydrate from shale containing chemically combined alumina, iron and silica.

An object of the invention is to provide an inexpensive, simple, and easily controlled process of separating chemically combined alumina from shale deposits which are high in silica content.

Heretofore, great difficulty has been encountered in separating the components of alumina bearing clays and shale, on account of the silica and iron which is chemically combined with the alumina and adheres with great tenacity thereto. These difficulties are overcome in the present process, and by its use I am able to extract a very large proportion of the contained alumina in the form of an aluminum hydrate from the shale. The iron and silica content are precipitated from the alumina as by-products and may be utilized for many purposes as they are in a very pure condition.

The particular shale deposits which have been worked with great success are those located in Roanoke County, Virginia. A chemical analysis of the shale from these deposits discloses that they contain approximately 36% $Al_2O_3$, 5% $Fe_2O_3$, 55% $SiO_2$, ½% $MgO$, ½% of traces of other ingredients and approximately 3% moisture.

Briefly, my improved process consists in digesting ground shale in a combination of strong acids, heating the mixture, and successively precipitating the silica, the iron and the alumina.

A practical working example of my process is as follows:

1 ton (2000 pounds) of shale is ground to such a fineness that it will pass through a 200 mesh screen. This material is then placed in a pressure retort or autoclave and thoroughly agitated with 180 pounds of hydrochloric acid, 40 pounds of hydrofluoric acid and 70 gallons of water. The acid used, weighing approximately 7 pounds per gallon, so that about 33½ gallons of acid are used per ton of shale. The concentration of the acids is preferably from 9 to 15° Bé. for the hydrochloric and 2° Bé. for the hydrofluoric.

After the acid and shale have been agitated sufficiently to thoroughly mix the ingredients, the retort is sealed and heated by the introduction of steam for a period of approximately 4 hours. The steam pressure is increased in the retort to between 15–20 pounds per square inch. Compressed hot air may be used to maintain the heat within the retort after it has been initially heated by the steam, so that any dilution of the acid mixture by the continual condensing of the steam will be avoided.

On the completion of the cooking step the pressure in the retort is run up to about 60 pounds per square inch to vaporize the acids, the vapors of which are led from the retort and condensed for further use. This allows the recovery of the majority of the acid.

Of the initial material, approximately 65% of the alumina, 60% of the silica, and practically all of the iron are dissolved, the remaining undissolved portions lying in the bottom of the retort as a mud. The solution containing the dissolved ingredients is then conveyed to a settling tank and rapidly dumped on to from 10 to 12 pounds of caustic soda, just enough caustic soda being used so that the solution does not become neutralized but remains slightly acidic. This precipitates the silica content from the solution which is siphoned from the bottom of the tank and recovered, the silica being in the form of a silica gel.

After the silica has been removed, enough caustic soda is added to the remaining solution to cause it to become alkaline in reaction, approximately 25 pounds of caustic soda being used for this purpose. Immediately on becoming alkaline, the iron is precipitated. If desired, a direct electric current of 7 volts—500 to 1000 amperes—may be passed through the solution to hasten the precipitation of the iron.

The aluminate remaining in the solution is then siphoned off the top of the iron precipitate and conveyed to another tank. The solution, containing the aluminate is then acidified by the addition of sufficient hydrochloric acid to precipitate the true aluminum hydrate.

The aluminum hydrate recovered contains approximately 40% water content and bears a physical resemblance to flour. Further treatment of the hydrate for use in the various arts may be carried out by any of the well known processes.

I claim:

1. A process of producing alumina from shales containing chemically combined alumina, silica and iron, which consists in digesting the said shales in a mixture of hydrochloric and hydrofluoric acids and water, heating under pressure the solution thus formed, precipitating the silica content from the solution by the addition of a substantially small amount of alkali thereto, precipitating the iron content from the solution by the addition of a further amount of alkali sufficient to form aluminate, and, finally, precipitating the alumina from the aluminate solution by the addition of an acid to said solution.

2. The process of producing alumina from shales containing chemically combined alumina, silica and iron which consists in digesting the said shales in a mixture of hydrochloric and hydrofluoric acids and water, heating under a pressure of from 15 to 20 lbs. for a period of 4 hours, precipitating the silica content from the solution by the addition of a substantially small amount of alkali thereto, precipitating the iron content from the solution by the addition of a further amount of alkali sufficient to form aluminate, and, finally, precipitating the alumina from the aluminate solution by the addition of an acid to said solution.

3. In a process of obtaining alumina from shales containing chemically combined alumina, silica and iron, which consists in treating 2000 lbs. of said shale with approximately 180 lbs. of hydrochloric acid, approximately 40 lbs. of hydrofluoric acid and approximately 580 lbs. of water, heating the solution for a period of approximately 4 hours in a pressure retort under approximately 15 to 20 lbs. pressure, and precipitating the silica content from the solution by the addition of a substantially small amount of caustic soda thereto, precipitating the iron content from the solution by the addition of a further amount of caustic soda sufficient to form aluminate, and, finally, precipitating the alumina from the aluminate solution by the addition of hydrochlorc acid.

In testimony whereof I affix my signature.

THOMAS O. McADOO.